(12) United States Patent
Pennala et al.

(10) Patent No.: US 10,144,402 B2
(45) Date of Patent: Dec. 4, 2018

(54) BRAKE-BY-WIRE SYSTEM

(71) Applicant: GM Global Technology Operations LLC, Detroit, MI (US)

(72) Inventors: Brandon C. Pennala, Howell, MI (US); Christopher C. Chappell, Commerce Township, MI (US); Paul A. Kilmurray, Wixom, MI (US); Patrick J. Monsere, Highland, MI (US); Eric E. Krueger, Chelsea, MI (US); Alan J. Houtman, Milford, MI (US); Kevin S. Kidston, New Hudson, MI (US); Michael C. Roberts, Auburn Hills, MI (US); Steven J. Weber, Mount Clemens, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 81 days.

(21) Appl. No.: 15/250,346

(22) Filed: Aug. 29, 2016

(65) Prior Publication Data
US 2018/0056959 A1    Mar. 1, 2018

(51) Int. Cl.
*B60T 13/74*    (2006.01)
*B60T 17/18*    (2006.01)
(Continued)

(52) U.S. Cl.
CPC ............ *B60T 13/741* (2013.01); *B60T 7/042* (2013.01); *B60T 13/662* (2013.01); *B60T 17/18* (2013.01); *B60T 2270/40* (2013.01); *B60T 2270/402* (2013.01); *B60T 2270/403* (2013.01); *B60T 2270/404* (2013.01); *B60T 2270/414* (2013.01); *B60T 2270/415* (2013.01); *B60T 2270/82* (2013.01)

(58) Field of Classification Search
CPC ... B60T 8/90; B60T 8/92; B60T 8/885; B60T 8/4081; B60T 17/18; B60T 17/221; B60T 2270/402; B60T 2270/406; B60T 2270/408; B60T 2270/413; B60T 2270/414; B60T 2270/403; B60T 2270/415; B60T 13/741
USPC .... 303/122, 122.01, 122.02, 122.03, 122.04, 303/DIG. 9, 122.08
See application file for complete search history.

(56) References Cited

U.S. PATENT DOCUMENTS 5,961,190 A * 10/1999 Brandnneier ........... B60T 7/042
                                                     188/159
6,213,567 B1 * 4/2001 Zittlau .................... B60T 7/042
                                                     188/158

(Continued)

*Primary Examiner* — Robert A. Siconolfi
*Assistant Examiner* — San M Aung
(74) *Attorney, Agent, or Firm* — Cantor Colburn LLP

(57) ABSTRACT

A vehicle includes a plurality of brake assemblies and a plurality of electronic brake system (EBS) controllers. The brake assemblies each include an electro-mechanical actuator configured to adjust a torque force applied to a wheel of the vehicle. The EBS controllers are located remotely from one another. Each EBS controller has integrated therein an electronic actuator driver unit that includes an electronic power circuit configured to drive at least one of the electro-mechanical actuators. A first EBS controller is configured to drive a first group of electro-mechanical actuators, and a second EBS controller is configured to drive a second group of electro-mechanical actuators that exclude the electro-mechanical actuators of the first group.

18 Claims, 6 Drawing Sheets

(51) Int. Cl.
*B60T 7/04* (2006.01)
*B60T 13/66* (2006.01)

(56) References Cited

U.S. PATENT DOCUMENTS

| | | | |
|---|---|---|---|
| 2005/0225165 A1* | 10/2005 | Naik | B60T 8/321 303/20 |
| 2005/0275281 A1* | 12/2005 | Prescott | B60T 8/1708 303/119.3 |
| 2007/0170774 A1* | 7/2007 | Gerum | B60T 13/66 188/140 R |
| 2007/0222284 A1* | 9/2007 | Matsubara | B60T 8/885 303/122.04 |
| 2008/0021623 A1* | 1/2008 | Frey | B60T 8/321 701/70 |
| 2008/0296106 A1* | 12/2008 | Nilsson | B60T 8/321 188/156 |
| 2010/0198473 A1* | 8/2010 | Strengert | B60T 17/221 701/70 |
| 2010/0204894 A1* | 8/2010 | Strengert | B60T 17/221 701/70 |
| 2011/0320099 A1* | 12/2011 | Kim | B60T 8/885 701/70 |
| 2013/0043814 A1* | 2/2013 | Chuah | H02P 6/18 318/400.04 |

* cited by examiner

BRAKE-BY-WIRE SYSTEM

BACKGROUND

The invention disclosed herein relates to vehicle braking systems and, more particularly, to a vehicle including a brake-by-wire (BBW) system.

Current industrial automotive trends to reduce the number of overall mechanical components of the vehicle and to reduce the overall vehicle weight have contributed to the development of system-by-wire applications, typically referred to as X-by-wire systems. Once such X-by-wire system that has received increased attention is a brake-by-wire (BBW) system, sometimes referred to as an electronic braking system (EBS).

Unlike conventional mechanical braking systems, BBW systems actuate one or more vehicle braking components via an electric signal generated by an on-board processor/controller or received from a source external to the vehicle. In some systems, a BBW system is effected by supplanting a conventional hydraulic fluid-based service braking system with an electrical based system to perform basic braking functions. Such a system is typically provided with a manually actuated back-up system that may be hydraulically operated.

Since BBW systems typically remove any direct mechanical linkages and/or hydraulic force-transmitting-paths between the vehicle operator and the brake control units, much attention has been given to designing BBW control systems and control architectures that ensure reliable and robust operation. Various design techniques have been implemented to promote the reliability of BBW systems including, for example, redundancy, fault tolerance to undesired events (e.g., events affecting control signals, data, hardware, software or other elements of such systems), fault monitoring and recovery. One design approach to provide fault tolerance which has been utilized in BBW brake control systems has been to include a mechanical backup system that may be utilized as an alternate means for braking the vehicle.

SUMMARY

According to a non-limiting embodiment, a vehicle is provided that includes a fault tolerant electronic brake-by-wire (BBW) system. The vehicle includes a plurality of brake assemblies and a plurality of electronic brake system (EBS) controllers. The brake assemblies each include an electro-mechanical actuator configured to adjust a torque force applied to a wheel of the vehicle. The EBS controllers are located remotely from one another. Each EBS controller has integrated therein an electronic actuator driver unit that includes an electronic power circuit configured to drive at least one of the electro-mechanical actuators. A first EBS controller is configured to drive a first group of electro-mechanical actuators, and a second EBS controller is configured to drive a second group of electro-mechanical actuators that exclude the electro-mechanical actuators of the first group.

According to another non-limiting embodiment, a vehicle is provided that includes a fault tolerant electronic brake-by-wire (BBW) system. The vehicle comprises a plurality of brake assemblies and a plurality of electronic brake system (EBS) controllers. Each brake assembly includes an electro-mechanical actuator configured to adjust a torque force applied to a wheel of the vehicle. The plurality of EBS controllers are located remotely from one another. Each EBS controller has integrated therein an electronic actuator driver unit that includes an electronic power circuit configured to drive at least one of the electro-mechanical actuators. Each EBS controller among the plurality of EBS controllers is in electrical communication with the electro-mechanical actuator included in each brake assembly.

According to still another non-limiting embodiment, a method of controlling a fault tolerant electronic brake-by-wire (BBW) system comprises detecting, via at least one electronic brake system (EBS) controller among a plurality of EBS controllers, a brake request to brake at least one wheel coupled to a brake assembly of the vehicle. The method further comprises in response to detecting the brake request, initiating a first electronic actuator driver unit integrated in a first EBS controller and a second electronic actuator driver unit integrated in a second EBS controller located remotely from the first EBS controller. The method further comprises controlling at least one electro-mechanical actuator included in the brake assembly based on at least one of the first and second high-power drive signals so as to brake the at least one wheel according to the brake request.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
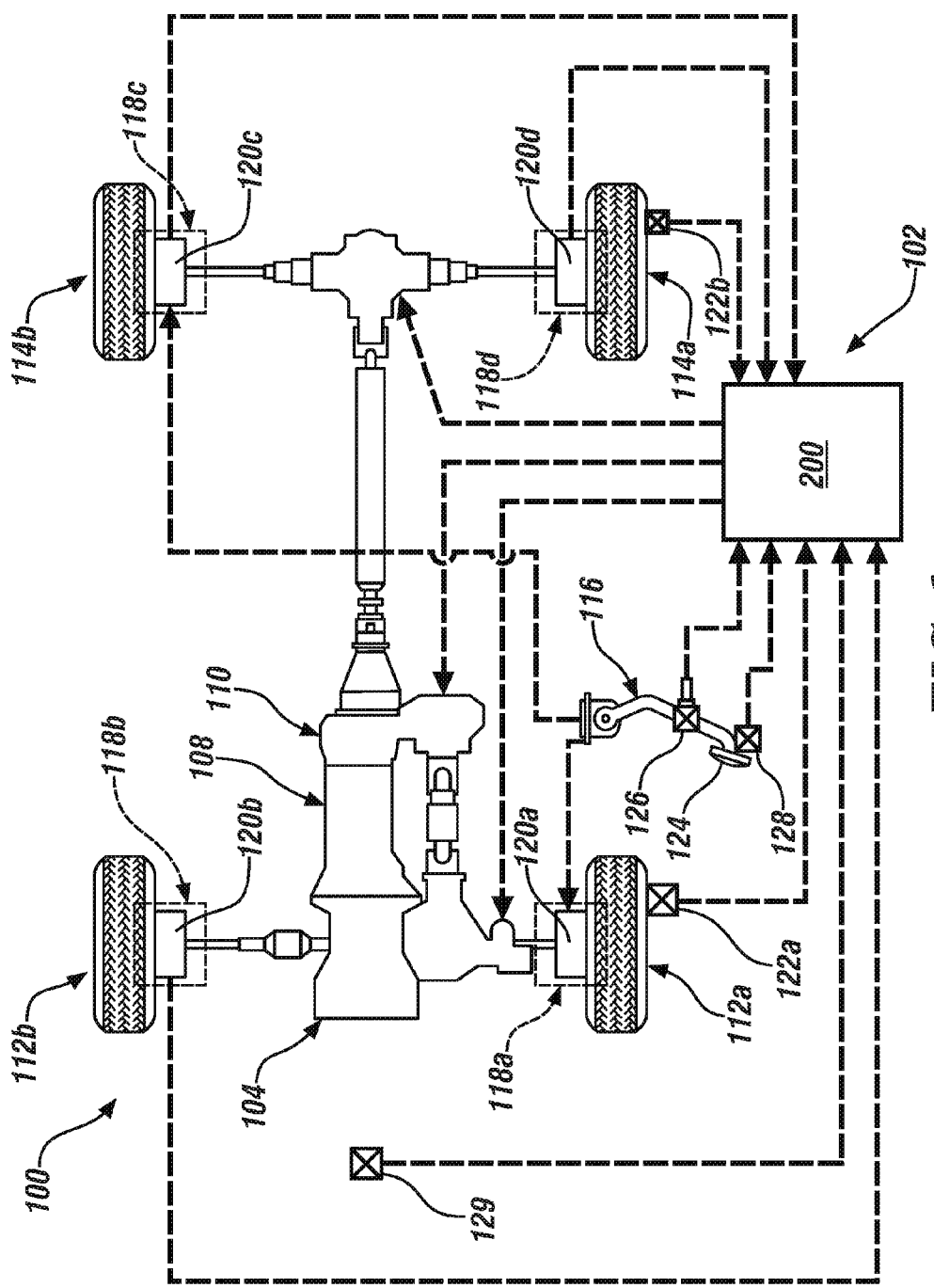
FIG. 1 is a top schematic view of a vehicle having a BBW system in accordance with a non-limiting embodiment.

The following description is merely exemplary in nature and is not intended to limit the present disclosure, its application or uses. It should be understood that throughout the drawings, corresponding reference numerals indicate like or corresponding parts and features.

Various non-limiting embodiments provide a fault tolerant BBW system including various independent BBW components to provide maximum flexibility in physical packaging. In at least one embodiment, the vehicle includes a plurality of brake assemblies, each including a respective actuator unit that controls a braking torque applied to the wheels. At least one brake assembly (e.g., a first brake assembly) among the plurality of brake assemblies includes an electro-mechanical actuator that operates in response to a first high-frequency switched high-power signal, while at least one other brake assembly (e.g., a second brake assembly) among the plurality of brake assemblies includes a second electro-mechanical actuator that operates in response to a second high-frequency switched high-power current signal different from the first high-frequency switched high-power current signal. The high-frequency switched high-power signals signal may have a frequency ranging from approximately 15 kilohertz (kHz) to approximately 65 kHz, and may have a current value of approximately 0 amps to approximately 200 amps.

In addition, the vehicle includes a plurality of individual electronic brake system (EBS) controllers. According to a non-limiting embodiment, a first EBS controller has integrated therewith a first actuator driver, and a second EBS controller has integrated therewith a second actuator driver. The actuator driver generates the first high-frequency switched high-power current signal, while the second actuator driver generates the second high-frequency switched high-power signal. Accordingly, a flexible BBW system is provided that allows for flexible design choice, while removing digital processing operations from the electro-mechanical actuators and also reducing the overall cost of the brake assemblies. In addition, the EBS controllers are capable of removing power to a malfunctioning actuator so as to employ fault tolerance into the BBW system.

With reference now to FIG. 1, a vehicle 100 including a fault tolerant BBW system 102 configured to electronically control braking of the vehicle 100 is illustrated according to a non-limiting embodiment. The vehicle 100 is driven by a powertrain system that includes an engine 104, a transmission 108 and a transfer case 110. The engine 104 includes, for example, an internal combustion engine 104 that is configured to generate drive torque that drives front wheels 112a and 112b and rear wheels 114a and 114b using various components of the vehicle driveline. Various types of engines 104 may be employed in the vehicle 100 including, but not limited to, a diesel engine, a gasoline engine, and a hybrid-type engine that combines an internal combustion engine with an electric motor, for example. The fault tolerant BBW system may also be implemented in a battery-powered electric vehicle including an electric motor without departing from the scope of the invention.

The vehicle driveline may be understood to comprise the various powertrain components, excluding the engine 104. According to a non-limiting embodiment, the drive torque is transferred to the transmission 108 via a rotatable crank shaft (not shown). Thus, the torque supplied to the transmission 108 may be adjusted in various manners including, for example, by controlling operation of the engine 104 as understood by one of ordinary skill in the art.

The fault tolerant BBW system 102 comprises a pedal assembly 116, brake assemblies 118a-118d (i.e., brake corner modules), one or more actuator units 120a-120d, one or more one or more wheel sensors 122a and 122b, and one or more electronic brake system (EBS) controllers 200. Although two wheel sensors 122a and 122b are shown, it should be appreciated that additional wheels sensors, e.g., four wheel sensors may be included without departing from the scope of the invention.

The pedal assembly 116 is in signal communication with the EBS controller 200, and includes a brake pedal 124, one or more pedal force sensors 126, and one or more pedal travel sensors 128. The pedal assembly 116 can be any combination of hardware and software that enables a component of the fault tolerant BBW system 102 to behave like a component not included in the fault tolerant BBW system 102. For example, the pedal assembly 116 can be a pedal emulator that behaves like a push-through mechanical pedal of a hydraulic braking system. In at least one embodiment, the pedal assembly 116 may be constructed exclusively of electronic wiring and software while omitting various mechanical and/or hydraulic components found in traditional pedal assemblies The EBS controller 200 is configured to detect brake pedal travel and/or braking force applied to the brake pedal 124 based on respective signals output from the pedal force sensor 126, and the pedal travel sensor 128. According to a non-limiting embodiment, the pedal force sensor 126 is implemented as a pressure transducer or other suitable pressure sensor configured or adapted to precisely detect, measure, or otherwise determine an apply pressure or force imparted to the brake pedal 124 by an operator of vehicle 100. The pedal travel sensor 128 may be implemented as a pedal position and range sensor configured or adapted to precisely detect, measure, or otherwise determine the relative position and direction of travel of brake pedal 124 along a fixed range of motion when the brake pedal 124 is depressed or actuated.

The measurements or readings obtained by the pedal force sensor 126 and the pedal travel sensor 128 are transmittable or communicable to one or more EBS controllers 200 or are otherwise determinable thereby as needed for use with one or more braking algorithms stored in memory of the EBS controller 200. The EBS controller 200 is also configured to calculate, select, and/or otherwise determine a corresponding braking request or braking event in response to the detected and recorded measurements or readings output from the wheel sensors 122a and 122b. Based on the determined braking request or braking event, the EBS controller 200 outputs a low voltage data command signal that invokes a braking action to slow down the vehicle 100 as discussed in greater detail below.

The wheel sensors 122a and 122b may provide various types of vehicle data including, but not limited to, speed, acceleration, deceleration, and vehicle angle with respect to the ground, and wheel slippage. In at least one embodiment, the fault tolerant BBW system 102 may include one or more object detection sensors 129 disposed at various locations of the vehicle 100. The object detection sensors 129 are configured to detect the motion and/or existence of various objects surrounding the vehicle including, but not limited to, surrounding vehicles, pedestrians, street signs, and road hazards. The EBS controller 200 may determine a scenario (e.g., a request and/or need) to slow down and/or stop the vehicle based on the data provided by the pedal assembly 116, the wheel sensors 122a and 122b, and/or the object detection sensor 129. In response to determining the braking scenario, the EBS controller 200 communicates a braking command signal to one or more brake assemblies 118a-118d to slow or stop the vehicle 100.

In at least one embodiment, the EBS controller 200 is integrated with an electronic actuator driver component such as, for example, an electronic power circuit. In this manner, the EBS controller 200 is capable of outputting a high-frequency switched high-power signal to drive the electro-mechanical actuators 120a-120d included in a respective brake assembly 118a-118d as discussed in greater detail herein.

The EBS controller 200 also includes programmable memory (not shown in FIG. 1) and a microprocessor (not shown in FIG. 1). In this manner, the EBS controller 200 is capable of rapidly executing the necessary control logic for implementing and controlling the actuators 120a-120d using a brake pedal transition logic method or algorithm which is programmed or stored in memory.

In addition, the EBS controller 200 (e.g., the memory) may be preloaded or preprogrammed with one or more braking torque look-up tables (LUTs) i.e. braking torque data tables readily accessible by the microprocessor in implementing or executing a braking algorithm. In at least one embodiment, the braking torque LUT stores recorded measurements or readings of the pedal force sensor 126 and contains an associated commanded braking request appropriate for each of the detected force measurements as determined by the pedal force sensor 126. In a similar manner, the EBS controller 200 may store a pedal position LUT, which corresponds to the measurements or readings of the pedal travel sensor 128 and contains a commanded braking request appropriate for the detected position of pedal travel sensor 128.

According to at least one embodiment, the fault tolerant BBW system 102 may also include an isolator module (not shown in FIG. 1) and one or more power sources (not shown in FIG. 1). The isolator module may be configured as an electrical circuit and is configured to isolate circuit faults such as, for example, wire-to-wire short circuits on a signaling line circuit (SLC) loop. The isolator module also limits the number of modules or detectors that may be rendered inoperative by a circuit fault (e.g. short to ground or voltage, etc.) on the SLC loop or by a circuit fault of one or more power sources 204a-204b, FIG. 2, (e.g. under-voltage, over-voltage, etc.). According to a non-limiting embodiment, if a circuit fault condition occurs, the isolator module may automatically create and open-circuit (disconnect) in the SLC loop so as to isolate the brake assemblies 118a-118d from a circuit fault condition. In addition, if a failure of a power source occurs, the isolator module may disconnect the failed power source while maintaining the remaining power sources. In this manner, the fault tolerant BBW system 102, according to a non-limiting embodiment, provides at least one fault tolerant feature which may allow one or more brake assemblies 118a-118d to avoid failure in the event a circuit fault condition occurs in the EBS 200. When the circuit fault condition is removed, the isolator module may automatically reconnect the isolated section of the SLC loop, e.g., the brake assemblies 118a-118d.

Figure 2A:
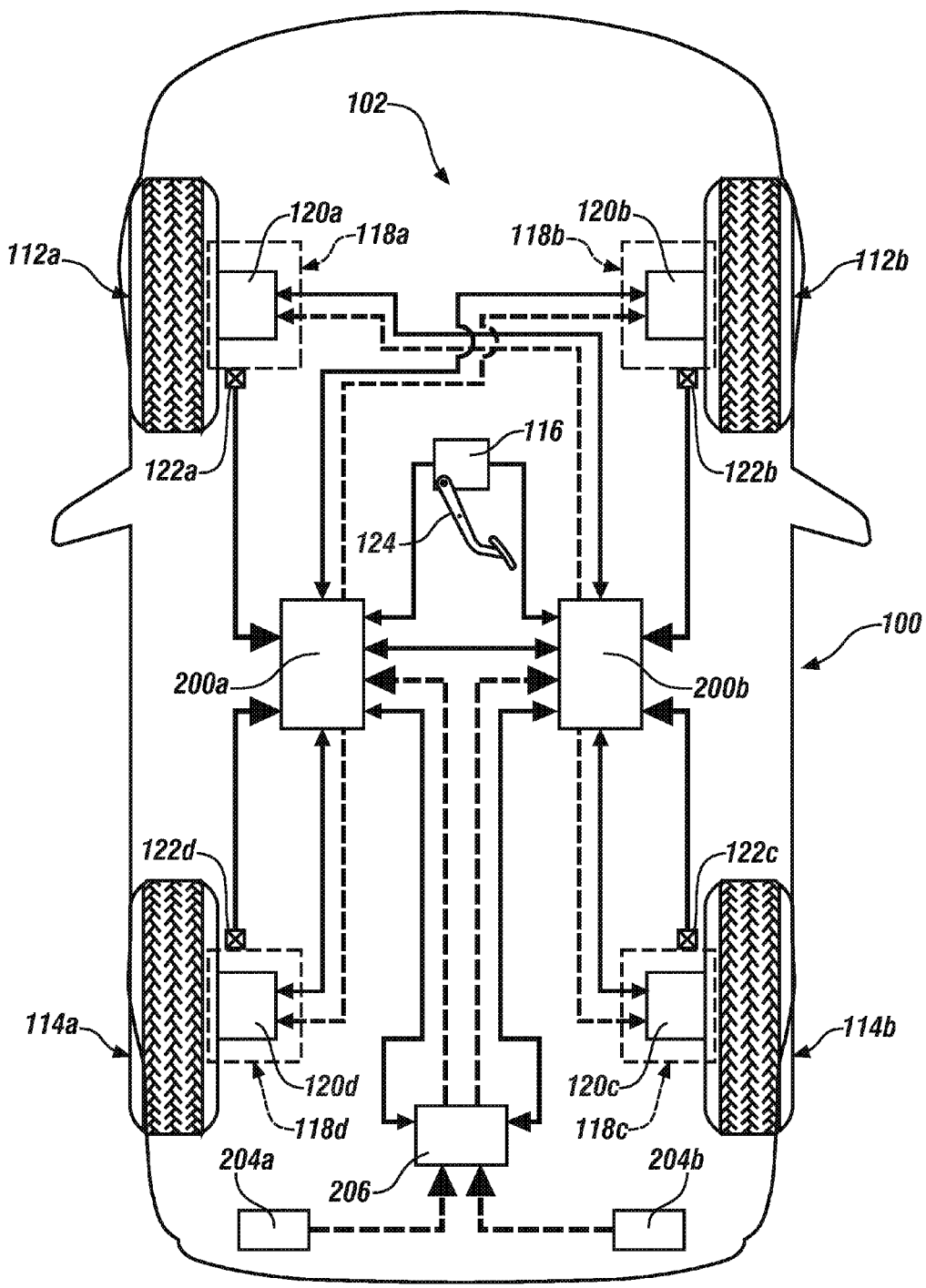
FIG. 2A is a schematic view of a BBW system based on a split EBS controller topology according to a non-limiting embodiment.
Figure 2B:
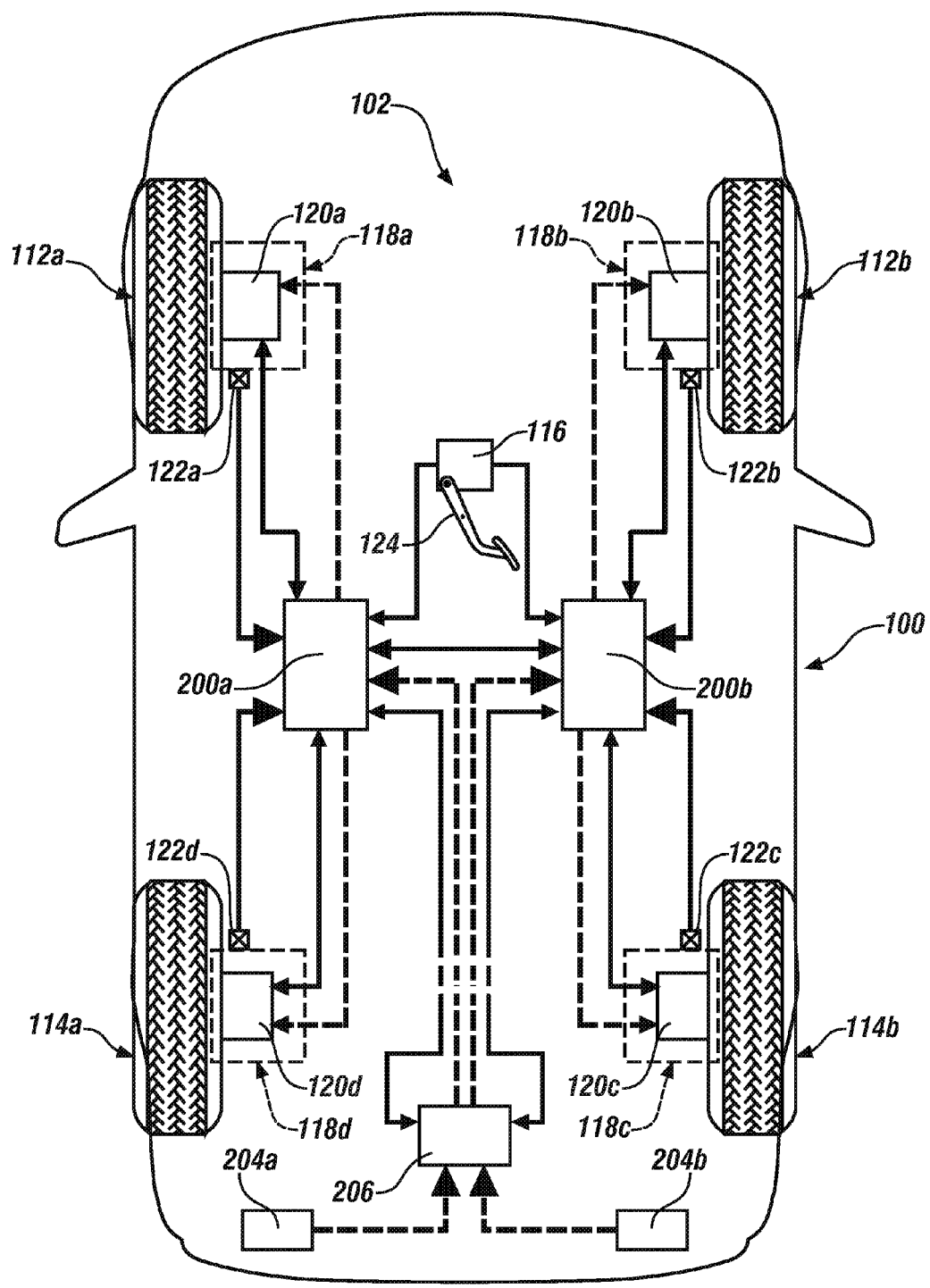
FIG. 2B is a schematic view of a BBW system based on a split EBS controller topology according to another non-limiting embodiment.
Figure 2C:
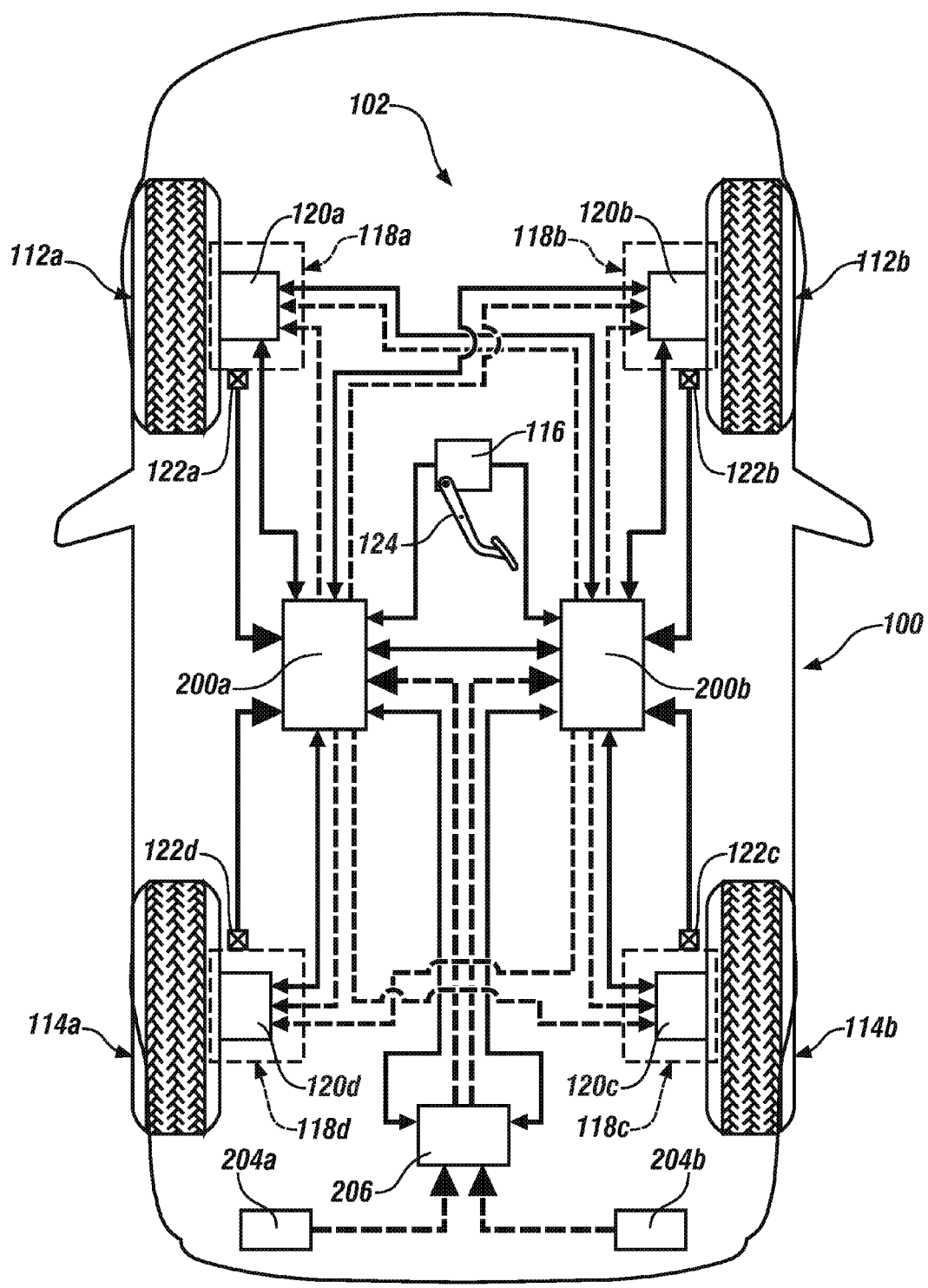
FIG. 2C is a schematic view of a BBW system based on a full EBS controller topology according to a non-limiting embodiment.

Turning to FIGS. 2A-2C, various embodiments of a fault tolerant BBW system are illustrated. Referring first to FIG. 2A, a fault tolerant BBW system 102 based on a split EBS controller topology is illustrated according to a non-limiting embodiment. The fault tolerant BBW system 102 includes a plurality of brake assemblies 118a-118d. Each brake assembly 118a-118d includes a respective electro-mechanical actuator unit 120a-120d that controls a braking torque applied to a respective wheel 112a and 112b/114a and 114b. The actuator unit 120a-120d may include, but is not limited to, a motor that drives an electronic caliper (e-caliper). The motor operates in response to a high-frequency switched high-power signal (illustrated as dashed arrows), and in turn drives the e-caliper which applies a variable frictional force to slow down the wheels 112a/112b-114a and 114b in response to receiving a stopping command. The stopping command may be provided manually by a driver and/or autonomously by a vehicle system.

Figure 3:
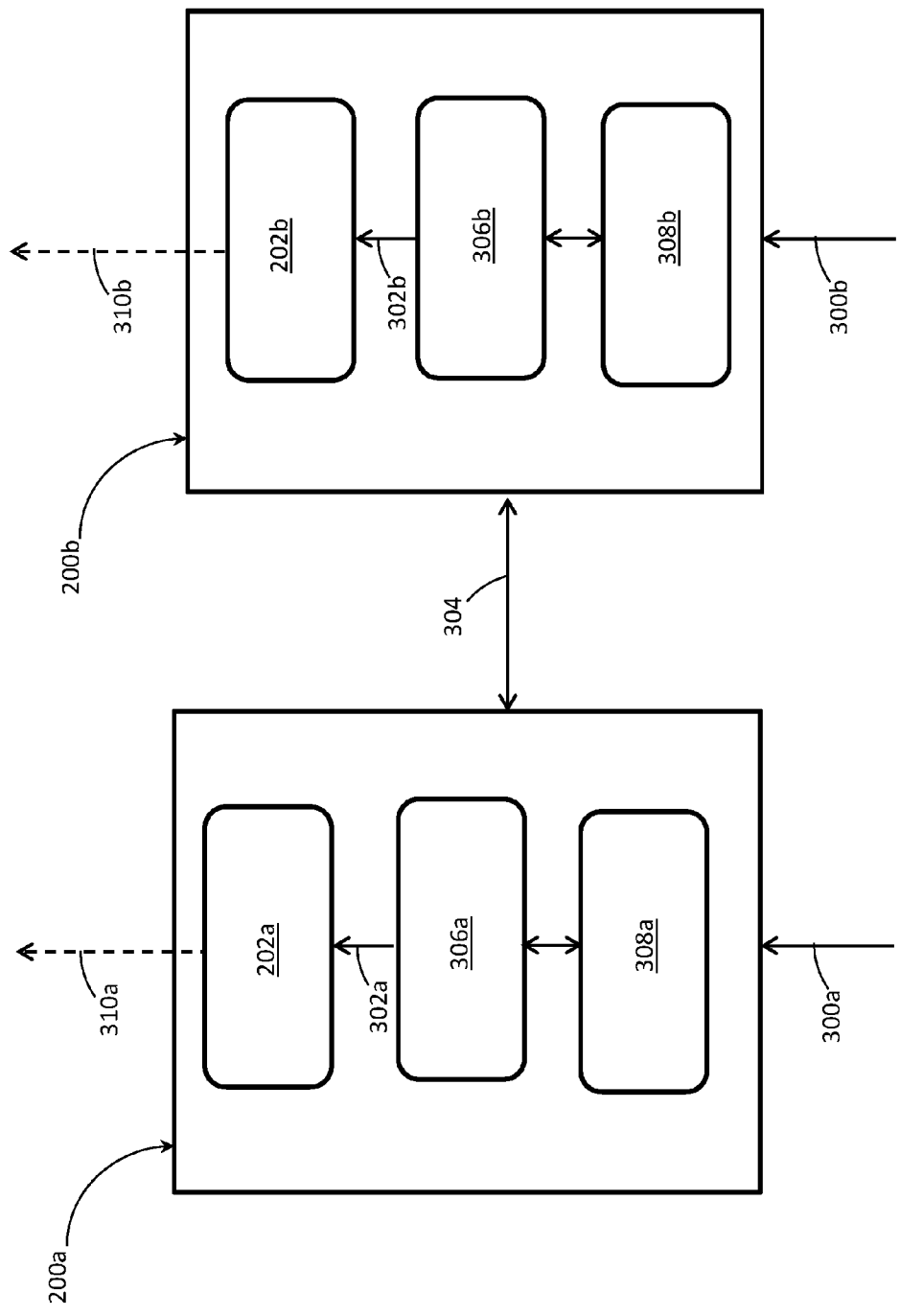
FIG. 3 is a block diagram illustrating a plurality of EBS controllers included in a BBW system according to a non-limiting embodiment.

The fault tolerant BBW system 102 further includes a plurality of EBS controllers 200a and 200b. According to the split-controller topology illustrated in FIG. 2A, the first EBS controller 200a drives a first group of brake actuators 120b/120d, while the second EBS controller 200b controls a second group of brake actuators 120a/120c. Each EBS controller 200a and 200b is integrated with a hardware processor (e.g., microcontroller) 306a and 306b and memory units 308a and 308b that store executable instructions including, but not limited to, braking algorithms and self-diagnosis algorithms (see FIG. 3). The hardware processors 306a and 306b are configured to read and execute the instructions stored in their respective memory units 308a and 308b so as to control the fault tolerant BBW system 102 as described in greater detail below.

As mentioned above, the EBS controllers 200a and 200b are also integrated with respective electronic actuator driver units 202a and 202b. The EBS controllers 200a and 200b receive one or more input data signals 300 delivered by one or more vehicle sensors (e.g., wheel sensors 122a-122d), and in turn, initiates a respective power circuit 202a and 202b as described herein. Once initiated, the power circuits 202a and 202b may output a high-frequency switched high-power signal 310 (illustrated as dashed arrows) to drive an electro-mechanical actuator 120a-120d included in a respective brake assembly 118a-118d. The first and second EBS controllers 200a and 200b may also share various data 304 between one another (see FIG. 3). The shared data includes, for example, detected brake requests, and diagnostic results obtained after performing self-diagnostic tests.

The actuator driver units 202a and 202b may be constructed as one or more electronic power circuits 202a and 202b including, but not limited to, a pulse width modulating (PWM) switching circuit, a power amplifier circuit, h-bridges, heat sinks, application-specific integrated circuits (ASICs), controller area network (CAN) transceivers or temperature or current sensors. The actuator driver units 202a and 202b each receive a constant high power input signal (e.g., non-switched high power input current) from a respective power source 204a and 204b. The high power input signal may include a high power current signal ranging from approximately 0 amps to approximately 200 amps.

In response to receiving a braking event data command signal from a respective EBS controller 200a and 200b, each actuator driver unit 202a and 202b is configured to output a high-frequency switched high-power signal to a respective electro-mechanical actuator 120a-120d. In at least one embodiment, the power circuits 202a and 202b generate a high-frequency switched high-current having a frequency that may range from approximately 15 hertz to approximately 65 hertz, and a current that may range from approximately 0 amps to approximately 200 amps. In turn, the high-frequency switched high-current signal drives the actuator, e.g., a motor, which then adjusts the e-caliper so as to apply a braking force on a respective wheel 112a and 112b/114a and 114b necessary to slow down and/or stop the vehicle as determined by the first EBS controller 200a. Although only a section of the fault tolerant BBW system 102 controlled by the first EBS controller 200a has been described, it should be appreciated that the second section of the fault tolerant BBW system 102 controlled by the second EBS controller 200b may operate in a similar manner as discussed above.

As further illustrated in FIGS. 2A-2C, the EBS controllers 200a and 200b are located remotely from the brake assemblies 118a-118d, while still being in electrical communication therewith so as to output the high-frequency switched high-power signal to the electro-mechanical actuators 120a-120d. The location of the EBS controllers 200a and 200b are also flexible and are not limited to any particular area of the vehicle 100. In this manner, the EBS controllers 200a and 200b may be located in close proximity to a related brake assembly 118a-118d so as to reduce the length of the high-current wires that deliver the high-frequency switched high-power signal for driving a respective electro-mechanical actuator 120a-120d.

In at least one embodiment, the first EBS controller 200a is in electrical communication with the second EBS controller 200b via a communication interface. The communication interface includes, but is not limited to, FlexRay™, Ethernet, and a low-power message-based interface such as, for example, a CAN bus. In this manner, the first and second EBS controllers 200a and 200b may share data with each other. FlexRay™ is a high-speed, fault tolerant time-triggered protocol including both static and dynamic frames. FlexRay™ may support high data rates of up to 10 Mbit/s.

In at least one embodiment, the first EBS controller 200a is in electrical communication with a first brake assembly 118b configured to brake a first wheel 112b located at a passenger side of the vehicle 100 (e.g., the front passenger-side wheel 112b) and a second brake assembly 118d configured to brake a second wheel 114a located diagonally from the first brake assembly 118b, i.e., at the driver side of the vehicle 100 (e.g., the rear driver-side wheel 114a). Similarly, the second EBS controller 200b is in electrical communication with a third brake assembly 118a configured to brake a third wheel 112a located at the driver side of the vehicle 100 (e.g., the front driver-side wheel 112a) and a fourth brake assembly 118c configured to brake a fourth wheel 114b located diagonally from the third brake assembly 118c, i.e., at the passenger side of the vehicle 100 (e.g., the rear passenger-side wheel 114b). Accordingly, the split-controller topology shown in FIG. 3A may be referred to as a diagonal split controller topology.

In another embodiment, the split-controller topology may be constructed as a front/rear split controller topology as illustrated in FIG. 2B. In this embodiment, the first EBS controller 200a is in electrical communication with brake assembly 118a located at the front driver-side of the vehicle 100 and brake assembly 118d located at the rear-driver side of the vehicle 100. Similarly, the second EBS controller 200b is in electrical communication with brake assembly 118b located at the front passenger-side of the vehicle 100 and brake assembly 118c located at the rear-passenger side of the vehicle 100.

In either topology described above, the EBS controllers 200a and 200b may be configured to monitor the state of the vehicle 100 based on inputs provided by one or more sensors. The sensors include, but are not limited to, the wheel sensors 122a-122d, and data signals output from the pedal assembly 116. Although not illustrated in FIG. 2A, the pedal assembly 116 includes various sensors that monitor the pedal 124 including, but not limited to, a pedal force sensor and a pedal travel sensor as discussed in detail herein. The outputs of the pedal force sensor and the pedal travel sensor may be delivered to both the first EBS controller 200a and the second EBS controller 200b to provide output redundancy. In at least one embodiment, the fault tolerant BBW system may include multiple pedal force sensors and multiple travel sensors to achieve output redundancy. Based on the state of the vehicle 100, the first EBS controller 200a and/or the second EBS controller 200b determines whether to invoke a braking event to slow down and/or stop the vehicle. When a braking event is determined, the first and second EBS controllers 200a and 200b each output a low power data command signal to a respective group of power circuits 202a and 202b. The low power data command signals may be delivered over the CAN bus to a respective power circuit 202a and 202b.

Implementing a low voltage message-based interface also allows the first and second EBS controllers 200a and 200b to conveniently communicate data between one another. In this manner, the first EBS controller 200a can inform the second EBS controller 200b of various detected braking events, and vice versa. The first and second EBS controller 200a and 200b may also share self-diagnosis data between one another. Therefore, each controller 200a and 200b may compare data received from one another in order to diagnose the fault tolerant BBW system 102, e.g., in order to determine whether the fault tolerant BBW system 102 is operating correctly.

In at least one embodiment, an isolator module 206 is connected between the first and second power sources 204a and 204b, and the remaining electrical system of the fault tolerant BBW system 102. The isolator module 206 is configured to receive constant high power signals generated by the first and second power sources 204a and 204b, and to generate a plurality of individual power input signals that are delivered to the EBS controllers 200a and 200b and the power circuits 202a and 202b. For example, the isolator module 206 outputs first and second constant high voltage power signals to each power circuit 202a and 202b as described in detail above. The isolator module 206 also outputs first and second low power signals that power the first and second EBS controllers 200a and 200b, respectively. In at least one embodiment, the first and second EBS controllers 200a and 200b are in electrical communication with the isolator module 206. In this manner, the first and second EBS controllers 200a and 200b may obtain various diagnostic information and circuit fault information including, but not limited to, short-circuit events, open circuit events, and over voltage events.

As mentioned above, the isolator module 206 may also be configured to isolate circuit faults including, for example, wire-to-wire short-circuits on a signaling line circuit (SLC) loop, and is capable of limiting the number of modules or detectors that may be rendered inoperative by a short-circuit fault on the SLC Loop. According to a non-limiting embodiment, if a wire-to-wire short occurs, the isolator module 206 may automatically create an open-circuit (disconnect) in the SLC loop so as to isolate the brake assemblies 118a-118d from a short-circuit condition. In this manner, the fault tolerant BBW system 102 according to a non-limiting embodiment provides at least one fault tolerant feature, which may allow one or more brake assemblies 118a-118d to avoid failure in the event a short-circuit condition occurs in the EBS 200. When the short-circuit condition is removed, the isolator module 206 may automatically reconnect the isolated section of the SLC loop, e.g., reconnect the brake assemblies 118a-118d.

Referring now to FIG. 2C, a fault tolerant BBW system 102 based on a full electronic brake system (EBS) controller topology is illustrated according to a non-limiting embodiment. The full EBS controller topology of FIG. 2C operates similar to the split EBS controller topology described above with reference to FIGS. 2A and 2B. However, the full EBS system of FIG. 2C differs in that each EBS controller 200a and 200b electrically communicates with each integrated power circuit 202a and 202b. For example, each EBS controller 200a and 200b may drive all the electro-mechanical brake actuators 120a-120d via integrated power circuits 202a and 202b. In this manner, if the first EBS controller 200a is unable to properly control the first power circuit 202a, the second EBS controller 200b may output the high-frequency switching high-power signal necessary to drive every electro-mechanical actuator installed on the vehicle 100. That is, every electro-mechanical actuator 120a-120d may be controlled by only the initiated EBS controllers (e.g., a single EBS controller 200a). In addition, a first actuator controller 200a may output a low-power data command signal to the second electronic actuator driver 202b integrated in the second actuator controller 200b. This allows the fault tolerant BBW system 102 to utilize the high-frequency switched high-power signal provided by the second actuator driver unit 202b even if the hardware processor 306b of the second actuator controller 200b is operating abnormally. Accordingly, the full controller BBW topology may provide additional fault tolerance functionality.

According to at least one embodiment, the full EBS controller topology includes a plurality of electronic brake system (EBS) controllers, where each EBS controller 200a and 200b among the plurality of EBS controllers is in electrical communication with each power circuit 202a and 202b. In addition, the power circuits 202a and 202b are located remotely from the brake assemblies 120a-120d, the first EBS controller 200a, and the second EBS controller 200b. Although the power circuits 202a and 202b may operate independently with respect to one another, each EBS controller 200a and 200b is configured to output a data control signal to control any of the power circuits 202a and 202b.

According to at least one embodiment, the EBS controllers 200a and 200b are configured to selectively operate in a split topology mode and a full topology mode based on data monitored by one or more EBS controllers 200a and 200b. The monitored data includes, but is not limited, diagnostic results obtained in response to self-diagnostic operations executed by the first and/or second EBS controllers 200a and 200b. When operating in the split topology mode, for example, the first EBS controller 200a controls a first group of electro-mechanical actuators 120b/120d while the second EBS controller 200b controls a second group of electro-mechanical actuators 120a/120c. When operating in the full topology mode, however, either the first EBS controller 200a or the second EBS controller 200b controls the electro-mechanical actuators 120a-120d of every brake assembly 118a-118d installed in the vehicle 100. That is, when operating in the full topology mode, either the first EBS controller 200a or the second EBS controller 200b may control all the electro-mechanical actuators 120a-120d.

As mentioned above, the EBS controllers 200a and 200b may transition into the full EBS topology mode based on diagnostic results obtained in response to performing self-diagnostic testing. For example, the first EBS controller 200a may perform a first self-diagnostic operation and communicate first diagnostic results to the second EBS controller 200b. Similarly, the second EBS controller 200b may perform its own second self-diagnostic operation and can communicate second diagnostic results to the first EBS controller 200a. A full EBS topology mode may then be initiated if the first diagnostic results and/or the second diagnostic results indicate an error. For example, if the second diagnostic results delivered by the second EBS controller 200b indicate an error, the first EBS can command the second EBS module 200b to enter into a stand-by mode or an off-line mode to invoke the full EBS topology mode, and in turn control all the power circuits 202a and 202b included in the fault tolerant BBW system 102. In this manner, if the second EBS controller 200b contains a fault, the fault tolerant BBW system 102 may still be fully operated by the first EBS controller 200a thereby providing a fault tolerance feature.

Figure 4:
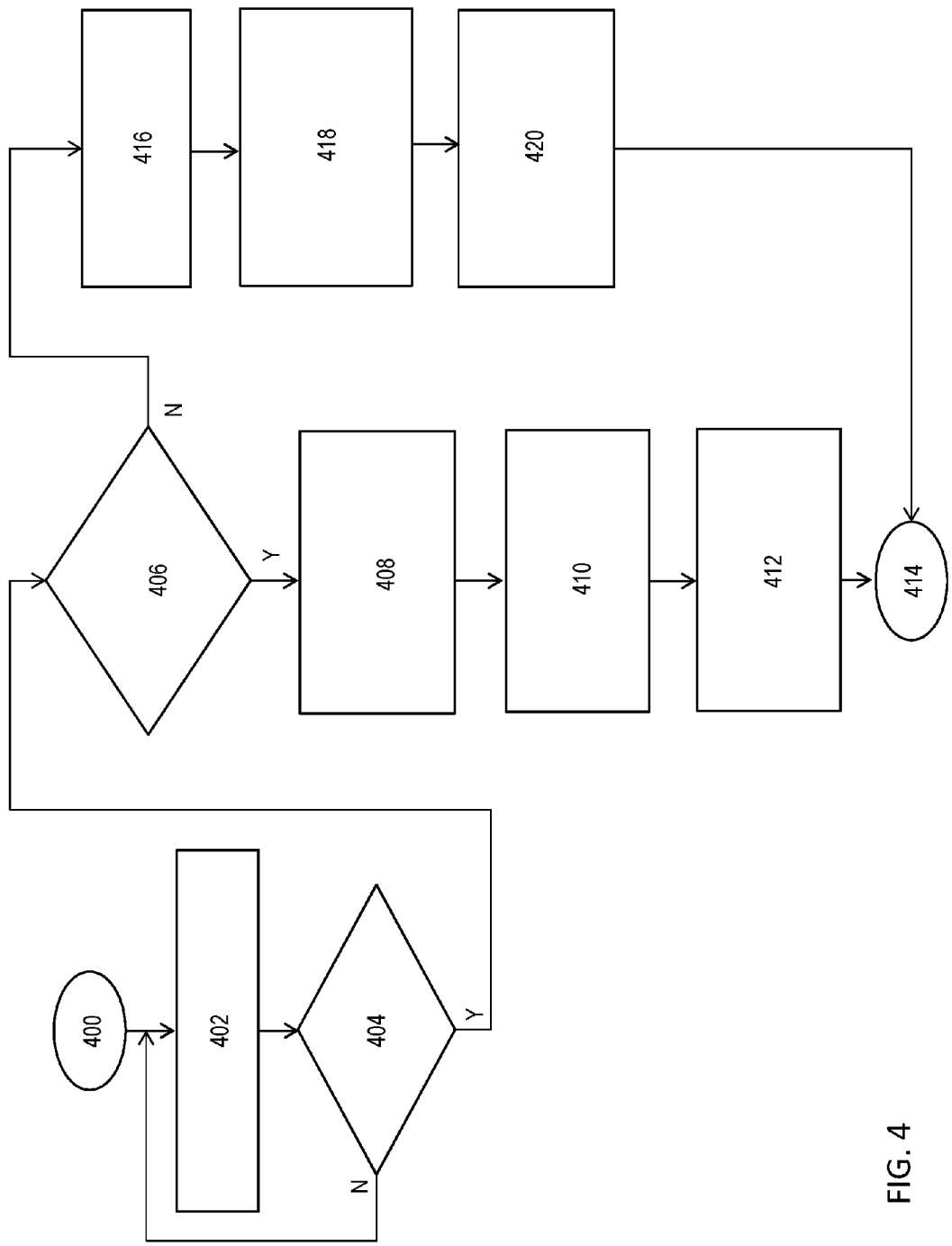
FIG. 4 is a flow diagram illustrating a method of controlling a fault tolerant BBW system according to a non-limiting embodiment.

Turning now to FIG. 4, a flow diagram illustrates a method of controlling a fault tolerant electronic brake system according to a non-limiting embodiment. The method begins at operation 400 and at operation 402. Sensor data is output to a first EBS controller and a second EBS controller. The sensor data may be output from various sensors installed on the vehicle including, but not limited to, wheel sensors, brake pedal sensors, and/or object detection sensors. At operation 404, a determination is made as to whether at least one EBS controller detects a braking event. The braking event is based on the sensor data described above. When no braking event is detected, the method returns to operation 402 and continues monitoring the sensor data.

When at least one of the EBS controllers detects a braking event, however, the first and second EBS controllers communicate with one another so as to compare their respective detected braking event data. For example, a first EBS controller may detect a first braking event and may request confirmation that the second EBS controller detected the same or a similar braking event. When the braking event data monitored and generated by the first EBS controller matches or substantially matches the braking event data monitored and generated by the second EBS controller, the method proceeds to operation 408 where the first EBS controller initiates a first electronic actuator driver integrated therein and the second EBS controller initiates a second electronic actuator driver therein. In this manner, separate actuator drivers are independently controlled by separate actuator controllers, respectively. At operation 410, the first actuator driver unit outputs one or more high-frequency switched high-power signals that drive a first group of electro-mechanical actuators, and the second actuator driver unit outputs one or more high-frequency switched high-power signals that drive a second group of electro-mechanical actuators which excludes the actuators of the first group.

In at least one embodiment, the first group of actuators includes a first electro-mechanical actuator installed in a first brake assembly and a second electro-mechanical actuator installed in a second brake assembly. The first brake assembly controls a first wheel (e.g., the front passenger-side wheel) and the second brake assembly is located remotely from the first brake assembly and controls a second wheel different from the first wheel (e.g., the rear driver-side wheel). Similarly, the second group of actuators includes a third electro-mechanical actuator installed in a third brake assembly and a fourth electro-mechanical actuator installed in a fourth brake assembly. The third brake assembly controls a third wheel (e.g., the front driver-side wheel) and the fourth brake assembly is located remotely from the third brake assembly and controls a fourth wheel different from the first wheel (e.g., the rear passenger-side wheel).

At operation 412, the first actuator adjusts a first braking torque applied to the first wheel and the second actuator adjusts a second braking torque applied to the second wheel. Similarly, the third actuator adjusts a third braking torque applied to the third wheel and the fourth actuator adjusts a fourth braking torque applied to the fourth wheel. In this manner, the vehicle can be slowed or stopped according to the braking event detected by the first and second EBS controllers, and the method ends at 414.

Referring back to operation 406, a scenario may occur where the braking event data monitored and generated by the first EBS controller does not match or substantially match the braking event data monitored and generated by the second EBS controller. In this case, the method proceeds to operation 416 where one of the first EBS controller and the second EBS controller initiates its respective integrated electronic actuator driver unit. At operation 418, the initiated electronic driver unit outputs one or more high-frequency switched high-power signals to drive the electro-mechanical actuators in every brake assembly installed on the vehicle. That is, every electro-mechanical actuator may be controlled by only the initiated EBS controllers (e.g., a single EBS controller). This fault tolerant feature allows operation of the vehicle brake assemblies in the event an EBS controller, or section of the BBW (including the sensors communicating with a particular EBS controller) associated with a particular EBS controller and/or actuator driver unit of a respective EBS controller experiences a fault. At operation 420, one or more electro-mechanical actuators adjusts a braking torque applied to a respective wheel, and the method ends at operation 414. In this manner, the vehicle may be slowed according to a detected braking event even if one or more of the EBS controllers or integrated actuator driver units do not operate according to expected conditions.

As described in detail above, various non-limiting embodiments provide a fault tolerant BBW system which strategically separates one or more BBW components from one another to provide maximum flexibility in physical packaging. In at least one embodiment, for example, the BBW system includes a plurality of individual electronic brake system (EBS) controllers that control at least one respective brake assembly. A first EBS controller controls a first power circuit, while a second EBS controller different from the first EBS controller controls a second power circuit. In addition, the first and second power circuits are located remotely from the respective brake assembly of which they power. Accordingly, a flexible BBW system is provided that allows for flexible design choice, wire length reduction, and flexible braking algorithm implementation, while still employing fault tolerance into the system. In addition, separating the power circuits from the EBS controllers and/or the brake assemblies eliminates the need to implementing additional thermal mitigation measures.

As used herein, the term "module" or "unit" refers to an application specific integrated circuit (ASIC), field programmable gate array (FPGA), an electronic circuit, an electronic computer processor (shared, dedicated, or group) and memory that executes one or more software or firmware programs, a combinational logic circuit, and/or other suitable components that provide the described functionality. When implemented in software, a module can be embodied in memory as a non-transitory machine-readable storage medium readable by a processing circuit and storing instructions for execution by the processing circuit for performing a method.

While the embodiments have been described, it will be understood by those skilled in the art that various changes may be made and equivalents may be substituted for elements thereof without departing from the scope of the embodiments. In addition, many modifications may be made to adapt a particular situation or material to the teachings of the embodiments without departing from the essential scope thereof. Therefore, it is intended that the disclosure not be limited to the particular embodiments disclosed, but that the disclosure will include all embodiments falling within the scope of the application.

What is claimed is:

1. A vehicle including a fault tolerant electronic brake-by-wire (BBW) system, the vehicle comprising:

a plurality of brake assemblies, each brake assembly including an electro-mechanical actuator configured to adjust a torque force applied to a wheel of the vehicle;

a plurality of electronic brake system (EBS) controllers located remotely from one another, each EBS controller selectively operable in a split-topology mode and a full-topology mode, and having, integrated therein, an electronic actuator driver unit that includes an electronic power circuit configured to drive at least one of the electro-mechanical actuators, wherein, in the split-topology mode, a first EBS controller of the plurality of EBS controllers is configured to drive a first group of electro-mechanical actuators, and a second EBS controller of the plurality of EBS controllers is configured to drive a second group of electro-mechanical actuators that exclude the electro-mechanical actuators of the first group, wherein, in the full-topology mode, one of the first EBS controller and the second EBS controller is deactivated, and a remaining non-faulty EBS controller is in electrical communication with the electro-mechanical actuator included in each brake assembly among the plurality of brake assemblies, and in response to detecting a faulty EBS controller among the first and second EBS controllers, the non-faulty EBS controller deactivates the faulty-controller and switches from the split-topology mode to the full-topology mode to control each electro-mechanical actuator included in each brake assembly among the plurality of brake assemblies.

2. The vehicle of claim 1, wherein the electronic actuator driver unit includes a pulse-width modulation (PWM) circuit in signal communication with a power amplifier circuit so as to generate a high-frequency switching high-power signal that drives an electro-mechanical actuator included in at least one of the first and second groups.

3. The vehicle of claim 2, wherein the first group of electro-mechanical actuators is controlled independently from the second group of electro-mechanical actuators.

4. The vehicle of claim 3, wherein the first EBS controller is in electrical communication with first and second electro-mechanical actuators, and the second EBS controller is in electrical communication with third and fourth elector-mechanical actuators.

5. The vehicle of claim 4, wherein the first EBS controller is configured to control the first electro-mechanical actuator independently from the second electro-mechanical actuator, and the second EBS controller is configured to control the third electro-mechanical actuator independently from the fourth electro-mechanical actuator.

6. The vehicle of claim 1, wherein the first EBS controller is in electrical communication with the second EBS controller, wherein the first EBS controller is configured to determine that the second EBS controller is the faulty EBS controller in response to diagnostic results received from the second EBS controller, and wherein the second EBS controller is configured to determine that the first EBS controller is a faulty EBS controller in response to diagnostic results received from the first EBS controller.

7. The vehicle of claim 6, wherein the first EBS controller communicates with the second EBS controller via a communication bus operating according to a message-based communication protocol.

8. The vehicle of claim 7, wherein the communication bus is at least one of controller area network (CAN) bus, a time-triggered protocol bust capable of supporting both static and dynamic frames, and an Ethernet interface.

9. A vehicle including a fault tolerant electronic brake-by-wire (BBW) system, the vehicle comprising:

a plurality of brake assemblies, each brake assembly including an electro-mechanical actuator configured to adjust a torque force applied to a wheel of the vehicle;

a plurality of electronic brake system (EBS) controllers located remotely from one another, each EBS controller having integrated therein an electronic actuator driver unit that includes an electronic power circuit configured to drive at least one of the electro-mechanical actuators, wherein each EBS controller among the plurality of EBS controllers is in electrical communication with the electro-mechanical actuator included in each brake assembly, wherein the plurality of EBS controller includes a first EBS controller and a second EBS controller remotely located from the first EBS controller, the first and second EBS controllers configured to selectively operate in a split topology mode and a full topology mode based on diagnostic results generated by at least one of the first and second EBS controllers.

10. The vehicle of claim 9, wherein the electronic actuator driver unit includes a pulse-width modulation (PWM) circuit in signal communication with a power amplifier circuit so as to generate a high-frequency switching high-power signal.

11. The vehicle of claim 10, wherein any electronic actuator driver unit integrated in a respective EBS controller among the plurality of EBS controllers is configured to output the high-frequency switching high-power signal to drive an electro-mechanical actuator included in any of the brake assemblies.

12. The vehicle of claim 9, wherein when operating in the split topology mode, the first EBS controller controls a first group of brake assemblies among the plurality of brake assemblies and the second EBS controller controls a second group of brake assemblies among the plurality of brake assemblies.

13. The vehicle of claim 12, wherein when operating in the full topology mode, one of the first EBS controller and the second EBS controller is deactivated, and a remaining activated EBS controller maintains a current operation of both the first group of brake assemblies and the second group of brake assemblies.

14. The vehicle of claim 13, wherein:
the first EBS controller performs a first self-diagnostic operation and communicates first diagnostic results to the second EBS controller;
the second EBS controller performs a second self-diagnostic operation and communicates second diagnostic results to the first EBS controller; and
at least one of the first and second EBS controllers initiate the full topology mode when at least one of the first and second diagnostic results indicate an error.

15. A method of controlling a fault tolerant electronic brake-by-wire (BBW) system, the method comprising:
detecting, via at least one electronic brake system (EBS) controller among a plurality of EBS controllers, a brake request to brake at least one wheel coupled to a brake assembly of the vehicle;
in response to detecting the brake request, initiating a first electronic actuator driver unit integrated in a first EBS controller of the plurality of EBS controllers and a second electronic actuator driver unit integrated in a second EBS controller of the plurality of EBS controllers located remotely from the first EBS controller; and
controlling at least one electro-mechanical actuator included in the brake assembly based on at least one of a first high-power drive signal and a second high-power drive signal so as to brake the at least one wheel according to the brake request,
selectively operating the first and second EBS controllers in a split topology mode and a full topology mode based on diagnostic results generated by at least one of the first and second EBS controllers, wherein in the split topology mode the first EBS controller controls only the first electro-mechanical actuator and the second EBS controller controls only the second electro-mechanical actuator, and in the full topology mode each of the first and second EBS controllers control both the first electro-mechanical actuator and the second electro-mechanical actuator.

16. The method of claim 15, further comprising outputting a first high-frequency switched high-power signal from the first electronic actuator driver unit, and outputting a second high-frequency switched high-power signal from the second electronic driver unit, the second high-frequency switched high-power signal being independently generated with respect to the first high-frequency switched high-power signal.

17. The method of claim 16, wherein the at least one electro-mechanical actuator includes a first electro-mechanical actuator included in a first group of brake assemblies and second electro-mechanical actuator included in a second group of brake assemblies different from the first group of brake assemblies.

18. The method of claim 17, further comprising driving the first electro-mechanical actuator included in a first group of brake assemblies based on the first high-frequency switched high-power signal, and driving the second electro-mechanical actuator included in a second group of brake assemblies based on the second high-frequency switched high-power signal, the second group of brake assemblies excluding the at least one first electro-mechanical actuator of the first group of brake assemblies.

* * * * *